United States Patent
MacInnis

(10) Patent No.: US 7,864,246 B2
(45) Date of Patent: Jan. 4, 2011

(54) SYSTEM, METHOD, AND APPARATUS FOR INTERLACED TO PROGRESSIVE CONVERSION USING WEIGHTED AVERAGE OF SPATIAL INTERPOLATION AND WEAVING

(75) Inventor: Alexander MacInnis, Ann Arbor, MI (US)

(73) Assignee: Broadcom Corporation, Irvine, CA (US)

( * ) Notice: Subject to any disclaimer, the term of this patent is extended or adjusted under 35 U.S.C. 154(b) by 1247 days.

(21) Appl. No.: 11/447,782

(22) Filed: Jun. 6, 2006

(65) Prior Publication Data

US 2006/0290806 A1 Dec. 28, 2006

Related U.S. Application Data

(60) Provisional application No. 60/687,674, filed on Jun. 6, 2005.

(51) Int. Cl.
*H04N 7/01* (2006.01)
(52) U.S. Cl. .................................................... 348/448
(58) Field of Classification Search ................ 348/448, 348/449, 454, 458, 459, 441, 445, 451, 452
See application file for complete search history.

(56) References Cited

U.S. PATENT DOCUMENTS

| | | | | |
|---|---|---|---|---|
| 5,818,597 | A * | 10/1998 | Hibbard et al. | 356/121 |
| 6,380,978 | B1 * | 4/2002 | Adams et al. | 348/452 |
| 7,176,977 | B2 * | 2/2007 | Zhu et al. | 348/448 |
| 7,468,757 | B2 * | 12/2008 | Wyman | 348/558 |
| 7,525,599 | B2 * | 4/2009 | MacInnis et al. | 348/448 |
| 7,535,512 | B2 * | 5/2009 | Chao | 348/448 |
| 7,605,866 | B2 * | 10/2009 | Conklin | 348/448 |
| 2005/0036063 | A1 * | 2/2005 | Chen et al. | 348/452 |

* cited by examiner

*Primary Examiner*—Paulos M Natnael
(74) *Attorney, Agent, or Firm*—McAndrews, Hold & Malloy, Ltd.

(57) ABSTRACT

Presented herein are system(s), and method(s), for interlaced to progressive conversion using weighted average of spatial interpolation and weaving. In one embodiment, there is presented a deinterlacer for deinterlacing. The deinterlacer comprises a first circuit and a second circuit. The first circuit measures weave artifacts between an alternate field and a field for a pixel at a pixel position in the alternate field. The second circuit generates a pixel value for the pixel position in the field, where the pixel value is the weighted average of the pixel, and an interpolated value from two or more pixels from the field, where the weighted average is a function of the weave artifacts.

20 Claims, 7 Drawing Sheets

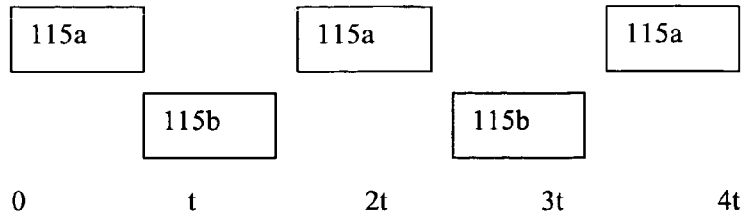
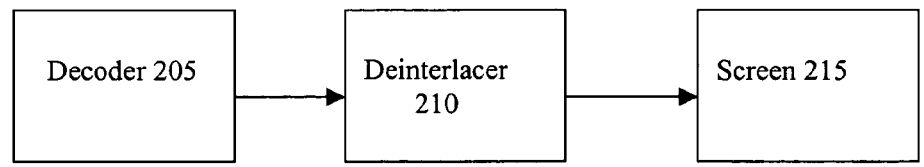
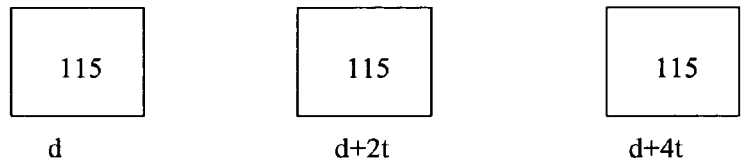
FIGURE 2
|  | 115b' | 115a | 115b" |
|---|---|---|---|
| 120(x, n-5) |  | x |  |
| 120(x, n-4) | x |  | x |
| 120(x, n-3) |  | x |  |
| 120(x, n-2) | x |  | x |
| 120(x, n-1) |  | x |  |
| 120(x, n) | x |  | x |
| 120(x, n+1) |  | x |  |
| 120(x, n+2) | x |  | x |
| 120(x, n+3) |  | x |  |
| 120(x, n+4) | x |  | x |
| 120(x, n+5) |  | x |  |
FIGURE 3

SYSTEM, METHOD, AND APPARATUS FOR INTERLACED TO PROGRESSIVE CONVERSION USING WEIGHTED AVERAGE OF SPATIAL INTERPOLATION AND WEAVING

PRIORITY CLAIM

This case claims priority to "SYSTEM, METHOD, AND APPARATUS FOR INTERLACED TO PROGRESSIVE CONVERSION USING WEIGHTED AVERAGE OF SPATIAL INTERPOLATION AND WEAVING", Provisional Application Ser. No. 60/687,674, filed Jun. 6, 2005 and incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In interlacing, the fields forming each frame are captured at two distinct time intervals. The pictures forming the video comprise a plurality of ordered lines. During one of the time intervals, video content for the even-numbered lines is captured, During the other time interval, video content for the odd-numbered lines is captured. The even-numbered lines may collectively be referred to as the top field, while the odd-numbered lines may collectively be referred to as the bottom field.

On an interlaced display the even-numbered lines are displayed on the even-numbered lines of the display during one time interval, while the odd-numbered lines are displayed on the odd-numbered lines of the display during another time interval.

With progressive displays, however, all of the lines of the display are displayed at one time interval. As noted above, the interlaced video pictures include even-numbered lines captured at one time interval, and odd-numbered lines captured at a second time interval. The deinterlacing process generates pictures for display during a single time interval from the interlaced video.

Deinterlacing by combining content from adjacent fields (known as weaving) is suitable for regions of the picture that are characterized by little or no object motion or lighting changes (known as inter-field motion). Displaying both the top field and bottom field at the same time interval can be problematic in cases where the video content has significant motion or lighting changes. Objects that are in motion are at one position when the top field is captured and another position when the bottom field is captured. If the top field and the bottom field are displayed together, a comb-like, or jagged edge affect will appear with the object. This is referred to as an artifact or as a weave artifact.

Alternatively, deinterlacers can generate a picture for progressive display by interpolating missing lines in a field from adjacent and surrounding lines. This is known as spatial interpolation, or "bobbing". While spatial interpolation avoids artifacts in regions with high inter-field motion, spatial interpolation loses vertical detail and tends to result in a blurry picture.

Accordingly, deinterlacers commonly measure motion of the video content. In regions of a picture that are characterized by significant amounts of motion, spatial interpolation is chosen, while in regions of the picture that are characterized by little or no motion, weaving is chosen.

In some cases, high vertical detail may be mistaken for motion. Additionally, the presence of noise can also be mistaken for motion. In such cases, although a region of picture is characterized by little or no motion, spatial interpolation may be chosen and this may not be the optimum choice.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Presented herein are system(s), and method(s), for interlaced to progressive conversion using weighted average of spatial interpolation and weaving, substantially as shown in and/or described in connection with at least one of the figures, as set forth more completely in the claims.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a block diagram of a progressive display in accordance with an embodiment of the present invention;

FIG. 3 is a diagram describing columns of pixels for a field, an alternate field, and another alternate field;

DETAILED DESCRIPTION OF THE INVENTION

Figure 1:
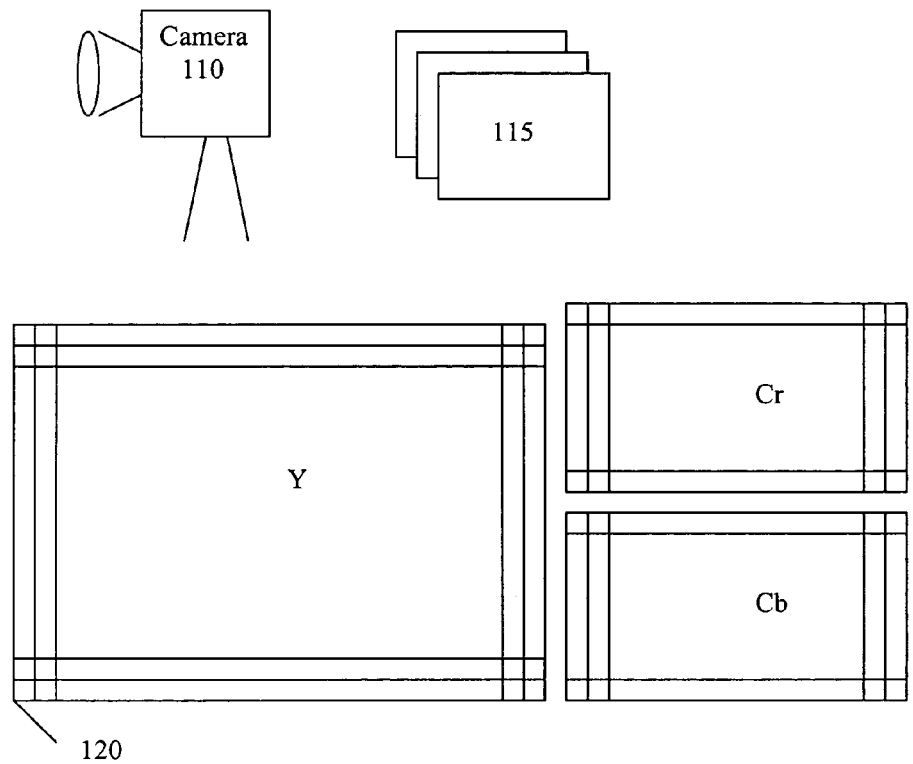
FIG. 1 is a block diagram of an exemplary interlaced video.
Figure 1:
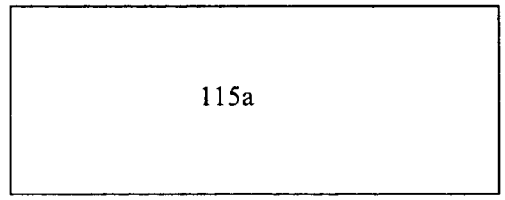
Figure 1:
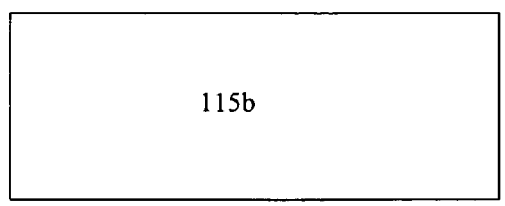

Referring to FIG. 1 is a block diagram of an exemplary video 105. A video 105 is generated by a video camera 110 and represents images captured by the camera 110 at specific time intervals. A picture 115 represents each image. The pictures 115 comprise two-dimensional grids of pixels 120, wherein each pixel in the grid corresponds to a particular spatial location of an image captured by the camera. The grids include chroma red difference pixels Cr, chroma blue difference pixels Cb, and luma pixels Y.

Each pixel 120 stores a color value describing the spatial location corresponding thereto. Accordingly, each pixel 120 is associated with two spatial parameters (x,y) as well as a time parameter. An interlaced camera, scans the rows 120(-, y) of a picture 115 in odd/even alternating order. The even numbered lines are scanned during one interval, t0, followed by the odd numbered lines scanned at another interval, t1. The partial images of the even number lines are referred to as top fields 115a, while the partial images of the odd numbered lines are referred to as bottom fields 115b.

Referring now to FIG. 2, there is illustrated a block diagram describing an exemplary progressive display 200, in accordance with an embodiment of the present invention. The progressive display 200 comprises a video decoder 205, a deinterlacer 210, and a screen 215. When the top field 115a and bottom field 115b are displayed at the rate of capture, motion video is simulated. For example, where the fields 115a/115b are captured at times 0 . . . nt, a progressive display device can display the fields 115a/115b at corresponding times d+0 . . . d+nt, where d represents a time displacement between the capture of the fields and the display of the fields.

The progressive display displays all of the lines 120(-, y) of a picture 115 during each display interval on the screen 115, and may have a display rate that equal to the field capture rate of the video camera. For example, the progressive display 200 may display an entire picture 115 at time intervals d, d+2t, d+4t, . . . . Where an interlaced video is to be displayed by the progressive display 200, it is possible that only one field 115a/115b corresponds to the display time [?]. For example, at display time d+2t, top field 115a captured at 2t is the only field corresponding to the time. Accordingly, the deinterlacer 210 generates the pixels for the odd-numbered lines 120(-, 2y+1) for the picture 115 to be displayed at d+2t.

The deinterlacer 210 generates the pixels on bottom field lines, e.g., the odd-numbered lines, using the top field 115a, the bottom field 115b' immediately preceding the top field 115a, and the bottom field 115b" immediately following the top field 115a.

For the missing pixels positioned at bottom field lines, e.g., lines 120(-, 2y+1) in the picture 115, the deinterlacer 210 uses a weighted average of a pixel in the pixel position from either bottom field 115b' or bottom field 115b", and a spatially interpolated value from surrounding pixels from the even numbered lines 120(-, 2y) in the top field 115a. The weighted average is based on measurements of weave artifacts and inter-field differences. In the foregoing example, the bottom fields 115b' and 115b" are referred to as alternate fields. It is noted that a bottom field 115b can be used as a current field with the alternate fields being the top fields 115a immediately preceding and following the bottom field. However, for purposes of discussion, the alternate fields will be bottom fields 115b' and 115b". Additionally, in certain embodiments both the top and bottom fields can be used alternately as the current field.

The term "alternate field" shall be understood to mean a field other than the current field, which may serve as a source for temporal interpolation or weaving. This can be the previous field, the following field, or some combination of various fields. Additionally, where reference is made to choosing between the previous and next fields, the previous and next fields can be combined through, e.g., averaging to produce values for feaving and for measuring weave artifacts and inter-field differences.

Referring now to FIG. 3, there is illustrated a diagram describing a column of pixels 120(x, 2y) for a field 115a and columns of pixels 120(x, 2y+1) for alternate fields 115b' and 115b". Pixels are denoted by the "*". To generate a given pixel position, e.g., 120(x, n), in the picture 115 that is not in the field 115a, the deinterlacer 210 uses a weighted average of the pixel 120(x, n) in alternate field 115b' or 115b" and a pixel value interpolated from pixels, e.g., 115a(x, n-3), 115a(x, n-1), 115a(x, n+1), 115a(x, n+3), in the column of pixels 115a(x, 2y) field 115a that surround the pixel position. The weighted average is based on measurements of detected weaving artifacts and inter-field differences.

Figure 4:
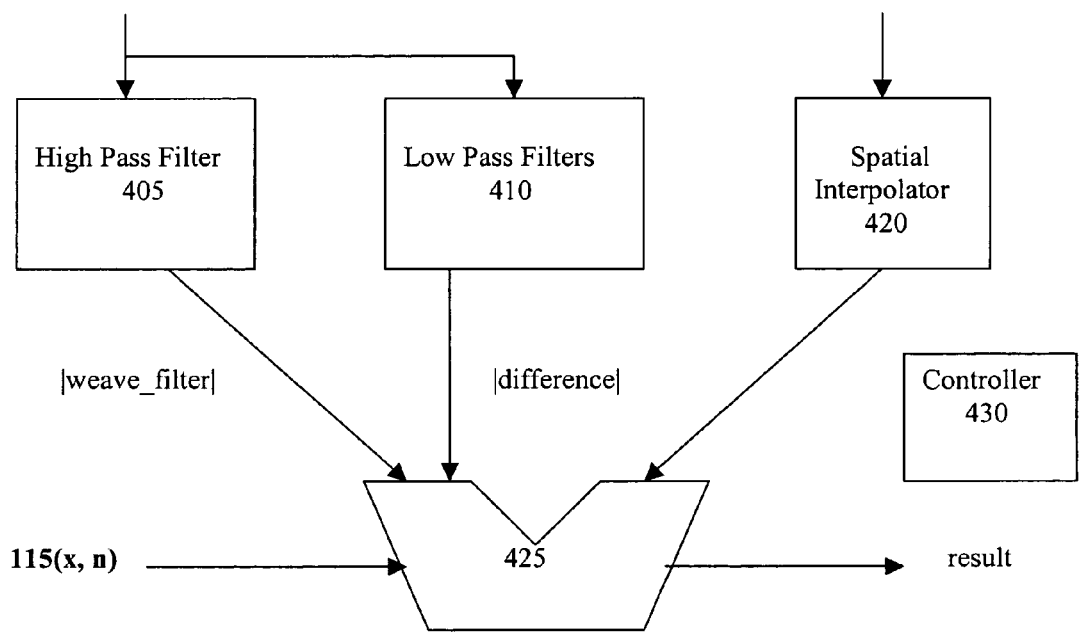
FIG. 4 is a block diagram of an exemplary deinterlacer.

Referring now to FIG. 4, there is illustrated a block diagram of the deinterlacer 210. The deinterlacer 210 comprises a high pass filter 405 for detecting weave artifacts, low pass filters 410 for detecting inter-field differences, a spatial interpolator 420 for spatial interpolating, an arithmetic logic unit 425 for calculating the weighted average of a pixel value from an alternate field 115b' or 115b" or, alternatively, both, and the spatial interpolated value from spatial interpolator 420, and a controller 430.

Detecting Weave Artifacts

A reason to detect motion and conditionally use spatial interpolation is to prevent visible weave artifacts, or "bad weaves", while using weaving more where artifacts would not result. For static imagery with high vertical frequency detail but no objectionable flicker on an interlaced display, the vertical bandwidth that can be used effectively is determined by the Kell factor, which is generally considered to be between 0.6 and 0.7. That is, the maximum vertical spectral component that results in perceived detail and not perceived flicker is between 0.6 and 0.7 of the frame Nyquist limit. The Nyquist limit for any one field of video is obviously 0.5 of the frame Nyquist, since fields have half the vertical sample rate of frames. The frame Nyquist limit is also referred to as 1.0 pi.

Bad weaves, on the other hand, tend to produce significant spectral components at 1.0 pi. Consider, for example, the case of a white rectangular object moving against a black background, in interlaced video. In any one field, if the missing lines were filled in using the previous field, i.e. pure weaving, at the edges of the white object would appear distinct comb-like black and white edges—this is a bad weave artifact. A vertical sequence of samples through this artifact consists of alternating black and white pixels—obviously this is the same as a high amplitude signal at 1.0 pi. The bad weave contains spectral components that are far higher in frequency than Kell-limited vertical detail. A graphical analysis of less obvious cases, such as a soft vertical gradient combined with a small amount of vertical motion, also results in a signal component centered at 1.0 pi added to the underlying true content. This added signal tends to have a broader spectrum than a sinusoid at 1.0 pi since the vertical extent of such gradients combined with motion is usually spatially limited, perhaps to only a few lines.

Detecting components at 1.0 pi and discriminating between these and Kell limited detail, in essence, discriminates between bad weave artifacts and true vertical detail. However, practical filters for detecting 1.0 pi have imperfect stop band attenuation. True content detail below 0.7 pi produces some output from practical high pass filters. If the magnitude of the detail is high enough and the sensitivity to the filter output is great enough, the control logic could incorrectly conclude that weaving would produce artifacts when in fact there is no motion and no artifacts would result. Filters with almost arbitrary stop band attenuation come at the expense of spatial locality. That is, to achieve extremely good frequency response, the output of the filter associated with one sample depends on a large number of input samples that are spread out across the image, perhaps many lines away. It's important to make the correct decision for each sample, with a spatial locality that corresponds to the visibility of weaving artifacts.

For the foregoing reasons, the high pass filter 405 uses a 7 tap vertical filter to detect bad weave components centered at 1.0 pi. The high pass filter 405 uses four vertical samples from the current field, e.g., 120(x, n-3), 120(x, n-1), 120(x, n+1), and 120(x, n+3), and samples 120(x, n-2), 120(x, n), and 120(x, n+2) from an alternate i.e. either field 115a' or 115a". The samples from the alternate field are spatially located between the samples from the current field. The table below gives the multiplication factors.

Such a filter can provide a reasonably good degree of discrimination between bad weave artifacts and true vertical detail combined with good spatial locality. One such filter is a high pass filter (HPF) with a pass band at 1.0 pi and attenuation of at least ~24 dB from 0 to 0.6 pi, and at least ~12 dB at 0.7 pi. This filter is defined by the equation below.

weave_filter( )=abs[[−32, 73, −110, 124, −110, 73, −32]/512]

| Field | Pixel Position | Tap Multiplier |
|---|---|---|
| Field 115a | 120 (x, n − 3) | −32 |
| Alt. Field 115b'/115b" | 120 (x, n − 2) | 73 |
| Field 115a | 120 (x, n − 1) | −110 |
| Alt. field 115b'/115b" | 120 (x, n) | 124 |
| Field 115a | 120 (x, n + 1) | −110 |
| Alt. field 115b'/115b" | 120 (x, n + 2) | 73 |
| Field 115a | 120 (x, n + 3) | −32 |
| RESULT DIVISOR | | 512 |

Figure 5:
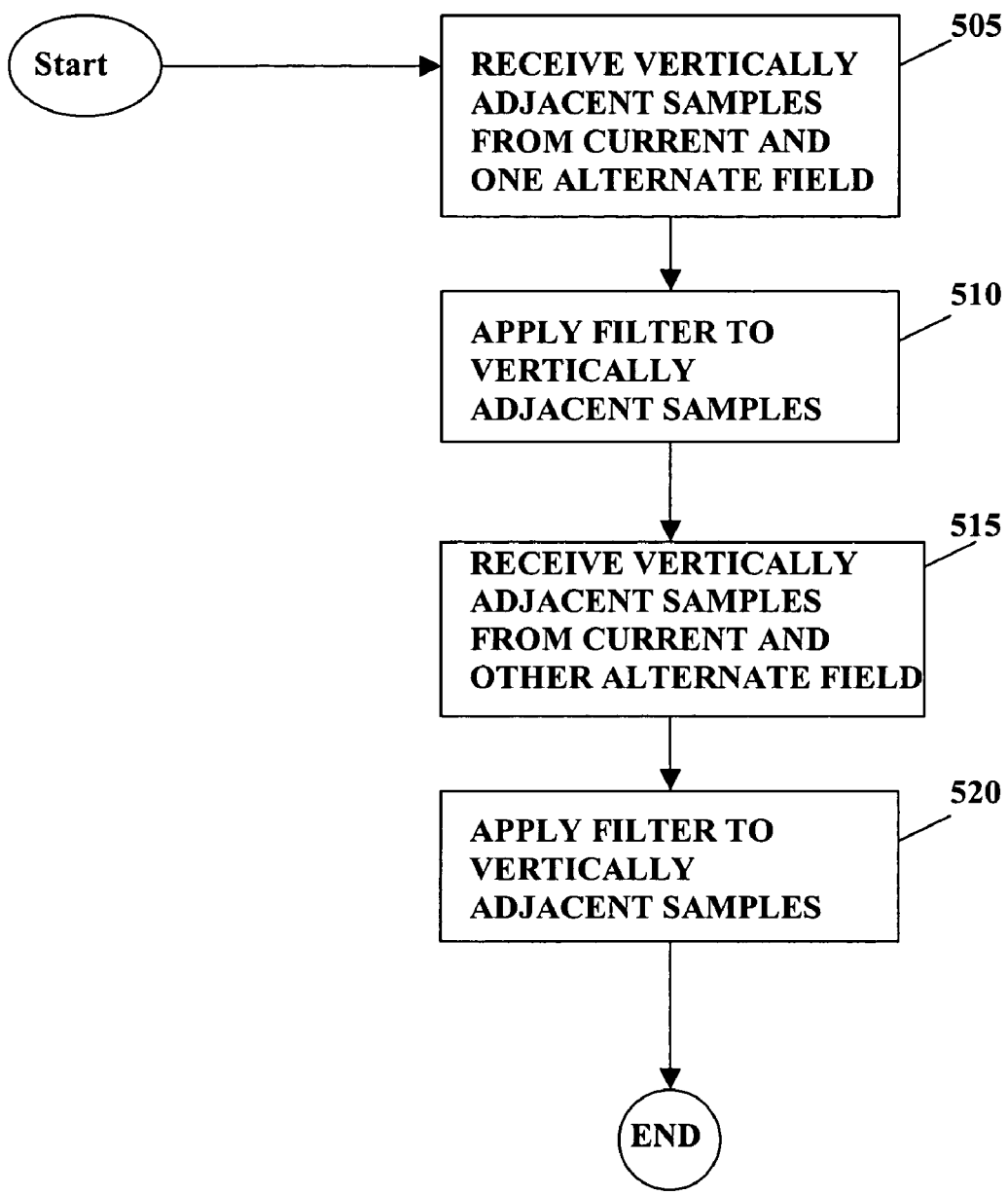
FIG. 5 is a flow diagram for detecting weave artifacts.

Referring now to FIG. 5, there is illustrated a flow diagram for weave artifact detection. At 505, a set of seven vertically adjacent samples from the current field and one of the alternate fields, e.g. field 115b' are received by the high pass filter 405. At 510, the filter is applied to the seven samples.

At 515, a set of seven vertically adjacent samples from the current field and the other alternate field, e.g. field 115b" are received by the high pass filter 405. At 520, the filter is applied to the seven samples.

The results, |weave_filter_prev( )| at 510 and |weave_filter_foll( )| at 520, provide an indication of weave artifacts that would occur if weaving were used at the current sample using each of the alternate fields 115b', 115b". These results are used in further processing, described below.

The term "motion" often refers to differences between pictures (fields or frames). Measuring the true motion of the content of the images is can be difficult, especially with noise, and especially when the motion information needs to be unique per pixel. Therefore, motion shall refer to differences, including differences due to motion, noise, lighting changes, or other causes.

When there is no motion, but a large amount of vertical detail, the high pass filter 405 for detecting weave artifacts might indicate the presence of weave artifacts when in fact there are none, because high amplitude true detail will pass through the high pass filter 405 with some attenuation, determined by the filter's stop band attenuation. Confidence that there is no motion, based on a lack of inter-field differences, may be used to bias the decisions towards weaving.

The high pass filter 405 for detecting bad weaves may have a low output level when there is a very large amount of true motion, and hence a large amount of detected motion (differences), while the image is smooth. Detection of large inter-field differences can be used to bias the decision towards spatial interpolation. In cases where there are modest amounts of inter-field differences, the decision of weave versus spatial may be controlled primarily by the high pass filter 405 for detecting bad weaves.

Inter-field differences can be detected using the low pass filter 410 in each of the current field 115a and the alternate field 115b' or 115b" with which it is being compared. The filter should provide good spatial locality (i.e. a small range of input samples affecting the output sample) and enough low pass filtering to reduce the effects of noise and high frequency vertical detail in the input. The filter should also be designed to phase align the results between the current 115a and alternate fields 115b', 115b", which are of opposite field polarity and hence with an offset sampling grid. Accordingly, the low pass filter 410 covers 4 lines in the current field 115a and 3 lines in the alternative field 115b', 115b", and in one embodiment covers at least 3 samples horizontally. The different number of lines (vertical axis) results from the need to center the low pass filter 410 responses of each filter on the current (to be constructed) sample, matching the phases of the filtered results from the different polarity fields.

In certain embodiments, each of the even and odd sets of coefficients from the high pass filter 405 above forms a low pass filter 410 applied to one of the fields. That is, a low pass filter 410 [−32 −110 −110 −32] is applied to the current field 115a (with a negative output). Similarly a low pass filter [73 124 73] is applied to the alternate field 115b', 115b", and it is also a low pass filter 410. The phases of these filters 410 are aligned since one is odd symmetrical and one is even symmetrical. However, the DC responses of these are not identical. Low pass filters 410 optimized for the present purpose may be somewhat different from these excerpts from the high pass filter 405 for detecting bad weaves.

It is noted that a single set of filter coefficients can serve as both a high pass filter 405 for detecting bad weave artifacts, and as a pair of low pass filters 410 for detecting inter-field differences, also known as motion. If the same filter design was to be used for both purposes, then there is either little or no difference between the resulting operations of detecting bad weave artifacts and detecting "motion" between the fields. One possible difference may lie in the use, or non-use, of a horizontal filtering component. For example, for a low pass filter 410 for inter-field differences, 3 or 5 samples may be filtered horizontally, while for the bad weave detection, 0 to 3 samples may be filtered horizontally. The horizontal filtering components may be made identical in these two operations. In such a case with both the vertical and horizontal filter components being the same for both bad weave detection and inter-field motion detection, there would typically be no separate operation for motion detection, rather it falls out automatically from the bad weave detection. According to certain aspects of the present invention, a 3 tap horizontal filter applied for inter-field difference detection, such as [1 2 1]/4, may be used.

Figure 6:
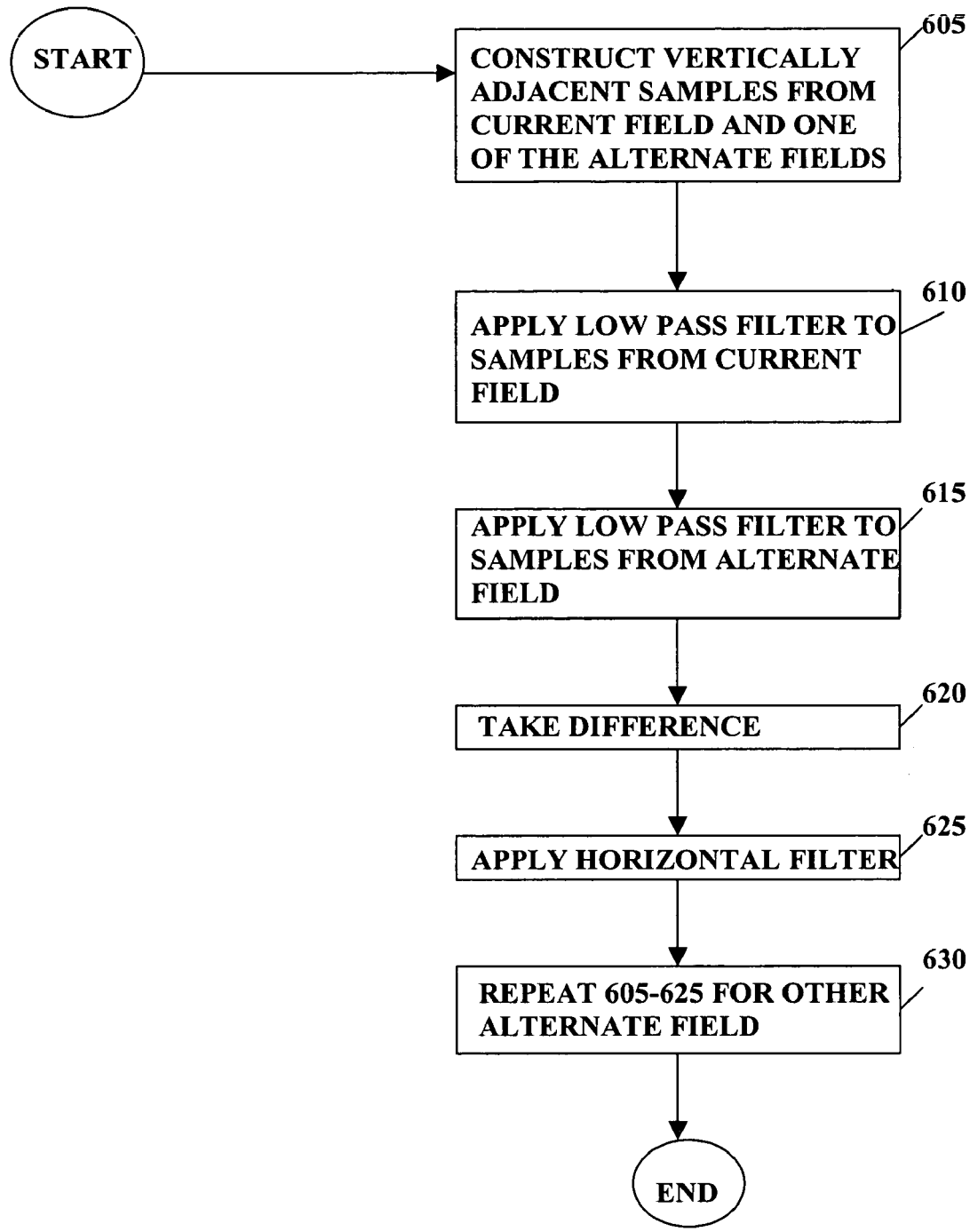
FIG. 6 is a flow diagram for measuring difference between alternate fields and the current field.

Referring now to FIG. 6, there is illustrated a flow diagram for inter-field difference detection. At 605, seven vertically adjacent samples from the current field 115a and one of the alternate fields, e.g., 115b' are constructed.

At 610, a low pass filter 410 is applied to the four samples from the current field 115a. At 615, a low pass filter 410 is applied to the three samples from the alternate field 115b', using a low pass filter 410 that is phase aligned with the low pass filter during 610. These may be similar to the odd and even coefficients from the high pass filter 405 for bad weave detection, but they may be designed for matched DC response and may have different low pass filter 410 characteristics from those extracted from the high pass filter 405 for bad weave detection.

At 620, the difference between the results during 610 and 615 is taken. It is noted that this is equivalent to performing a seven tap filter on the combined samples during the bad weave detection, as long as the signs of the coefficients alternate, as in the high pass filter 410 for bad weave detection.

At 625, a horizontal low pass filter 410 is applied on these results from 620, using a [1 2 1]/4 filter and the absolute value is taken. At 630, 605-625 are repeated for the other alternate field, e.g., alternate field 115b″.

The results during 625 for the previous alternate field 115b′, |difference_prev|, and the following alternate field 115b″, |difference_foll| provide an indication of the amount of inter-field differences of motion between the current sample using each of the alternate fields 115b′, 115b″. These results are used in further processing as described below.

All of the operations above can be performed on chroma components as well as on luma, or just on luma. Chroma processing can be performed almost identically to the luma processing specified here. Exceptions can include the horizontal chroma sampling density of 4:2:2 and hence little or no horizontal filtering as above, and how the chroma weave and motion detection results are used in subsequent processing.

It is also noted that in certain embodiments, the low pass filter can be applied to the results of 610 and 615. The difference of the filtered results can then be taken.

Weave Blend Control

The information produced above may be used to determine the value of a weave blend control for every sample. The outputs from the detection functions, |weave_filter_prev( )|, |weave_filter_foll( )|, |difference_prev( )| and |difference_foll( )|, are combined and subjected to a non-linear process to result in a single control variable weave_blend. Weave_blend controls the proportion of weave vs. spatial (interpolation) signals that are used in the final output for each sample.

Figure 7:
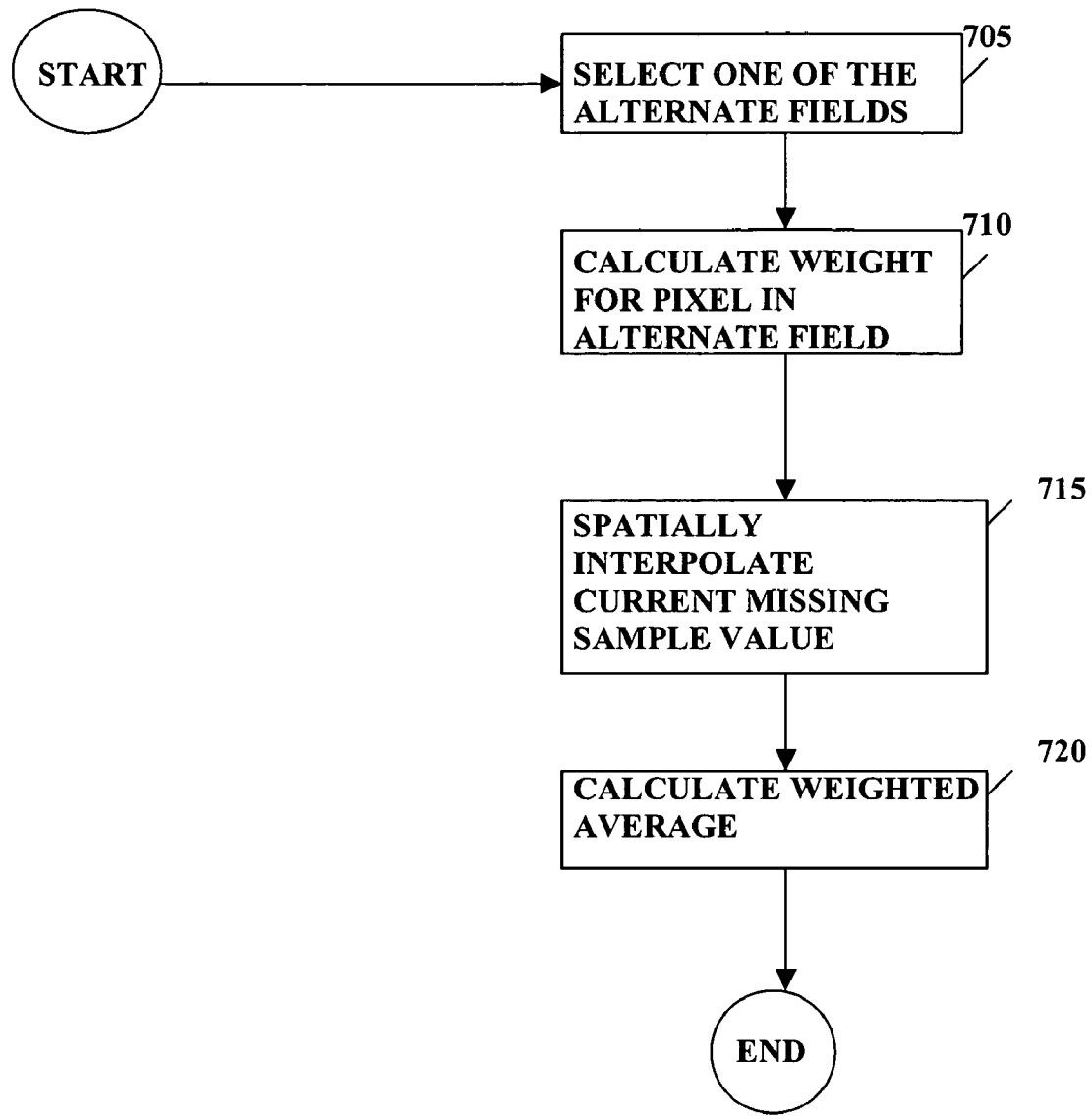
FIG. 7 is a flow diagram for generating a pixel value for missing pixel position in the current field.

Referring now to FIG. 7, there is a flow diagram for generating a pixel value 115a(x,n) that is the weighted average of the pixel in an alternate field, 115b′(x,n) or 115b″(x,n), and an interpolated value from the field 115a. The weighted average is a function of the measured weave artifacts and interfield differences.

At 705, the controller 430 selects one of the alternate fields 115b′/115b″. The choice of alternate field is determined by which field produces the smaller value of difference, i.e. |difference_prev( )| or |difference_foll( )|. If the two differences signals are exactly equal, the previous field is chosen 115b′. Alternatively, the following field 115b″ can be chosen. Also, alternatively both alternate fields may be utilized. For example, the samples from the two alternate fields may be averaged, or they may be combined using a weighted average. For example the weighting may be controlled by the measured inter-field differences |difference_prev( )| and |difference_foll( )|.]

At 710, the arithmetic logic unit 425 calculates a weight for the pixel (x, n) in the alternate field 115b′/115b″ selected during 705 for the difference and weave metrics of the selected alternate field 115b′/115b″.

The difference and weave metrics can be combined to form a single metric that represents the degree to which weaving would be inappropriate for the current sample, i.e. the degree to which spatial interpolation should be used.

This resulting metric is referred to as "weave_impair", and is defined to have a range of [0, 1]. Note that |weave_filter| and |difference| are defined to have ranges of [0, 255] since they have maximum gains of 1.0 and their inputs are 8 bit video, so the function to combine these should include appropriate scaling.

The table below correlates the measured difference value, |difference|, and the result of the high pass filter for detecting bad weaves, |weave_filter| to values for weave_impair (in the table, the value |weave_filter| is assumed to have been scaled such that a large degree of bad weave detection has a value of 0).

| | Weave_impair value | | |
|---|---|---|---|
| | Weave: very low (not visible) | Weave: moderate | Weave: very large (very visible) |
| Difference: 0 | 0 | <|weave_filter| | 1.0 |
| Difference: moderate | >|weave_filter| | ~|weave_filter| | 1.0 |
| Difference: very large (very visible) | 1.0 | 1.0 | 1.0 |

Figure 8:
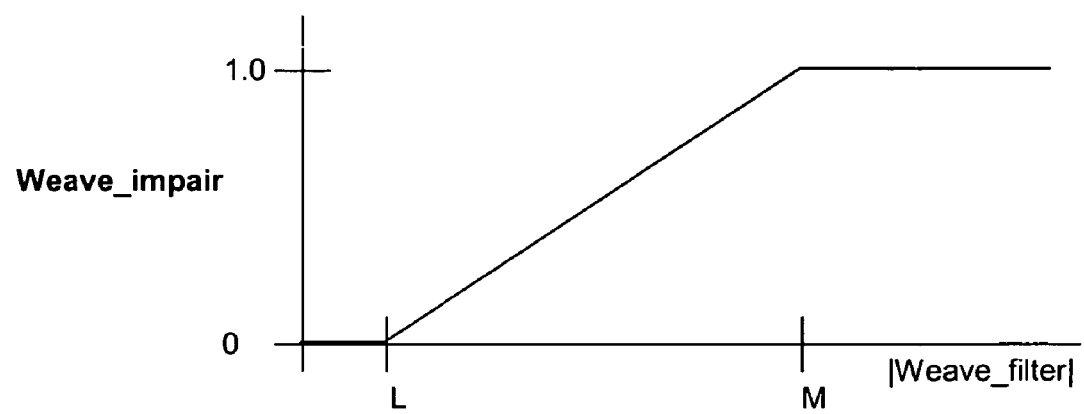
FIG. 8 is a graph describing the relationship between a bad weave metric and a weight.

Additionally, FIG. 8 is a graph describing the relationship between the metric |weave_filter|, and the weave_impair value. The value L is chosen to correspond approximately to the lower threshold of visibility of bad weave artifacts, and M is chosen to correspond approximately to a large amount of bad weave detection beyond which purely spatial interpolation can be used. According to certain aspects of the present invention, L=4, and M=40.

With |difference| included, the sloped function is shifted to the right when |difference| is small or zero, and to the left when |difference| is large compared to |weave_filter|, and no change when |difference| equals |weave_filter|.

The foregoing is achieved with the following formula:

Define: $x=|weave\_filter|+k*(|difference|-|weave\_filter|)$ k is a constant that controls the effect of the difference between |difference| and |weave_filter|, such as 0.5. The weight, weave_impair=min[(x−L)*1/(M−L), 1]

Note that 1/(M−L) is a constant for given values of L & M.

Referring again to FIG. 7, at 715, the spatial interpolator 420 interpolates the current missing sample value (x, n) from the current field 120a. In terms of filter design, the spatial interpolation function requirement is the similar to that required for a high quality 2× vertical scaler.

According to certain aspects of the present invention, the spatial interpolator 420 can use 4 taps vertically for pixels 115a(x, n−3), 115a(x, n−1), 115a(x, n+1), and 115a(x, n+3). The taps can be chosen for optimal scaling by 2, i.e. interpolation exactly half-way between the available data points. In another embodiment, a 6 tap spatial interpolator 420 may be used. Additionally, the spatial interpolator 420 can also use directional interpolators.

At 720, the arithmetic logic unit 425 receives the spatially interpolated value from the spatial interpolator 420, and the pixel value (x, n) from the alternate field 115b′/115b″, and calculates a result that is the weighted average of the foregoing, according to the formula below.

result=weave_impair*spatial_interpolation_result+(1−weave_impair)*weave result (from selected alternate field).

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processors, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in as machine readable instructions, such as in firmware, for example. In one embodiment, a deinterlacer can be incorporated into a single integrated circuit.

Although the embodiments described herein are described with a degree of particularity, it should be noted that changes, substitutions, and modifications can be made with respected to the embodiments without departing from the spirit and scope of the present application. Accordingly, the present application is only limited by the following claims and equivalents thereof.

The invention claimed is:

1. A deinterlacer for deinterlacing, said deinterlacer comprising:
   a first circuit for measuring weave artifacts between a first field and a second field for a pixel at a pixel position in the first field;
   a second circuit for generating a pixel value for the pixel position in the second field, said pixel value being the weighted average of the pixel, and an interpolated value from two or more pixels from the second field, the weighted average being a function of the measurement of weave artifacts.

2. The deinterlacer of claim 1, wherein the first circuit comprises:
   a high pass filter for high pass filtering at least one pixel from a plurality of lines from the second field, said plurality of lines comprising a first line that is above the pixel position and a second line that is below the pixel position, and one or more pixels from the first field, the one or more pixels comprising the pixel.

3. The deinterlacer of claim 1, further comprising:
   a third circuit for detecting inter-field differences between a region in the first field and a corresponding region in the second field, said first region comprising the pixel position; and
   wherein the weighted average is a function at least in part of the inter-field differences.

4. The deinterlacer of claim 3, wherein the third circuit comprises:
   one of more low pass filters for low pass filtering at least one pixel from a plurality of lines from the second field, said plurality of lines comprising a first line that is above the pixel position and a second line that is below the pixel position and for low pass filtering at least one pixel in the first field, the at least one pixel comprising the pixel.

5. The deinterlacer of claim 4, wherein the one or more low pass filters calculate a difference between a result from low pass filtering the at least one pixel from the plurality of lines from the second field and a result from low pass filtering the at least one pixel in the first field, and filter the result from low pass filtering the at least one pixel from the plurality of lines from the second field, the result from low pass filtering the pixel in the first field, and the difference.

6. The deinterlacer of claim 3, further comprising:
   a controller for selecting the first field from a first alternate field and a second alternate field, based on inter-field differences between the first alternate field and the second alternate field.

7. A method for deinterlacing, said method comprising:
   receiving a first field, and a second field;
   measuring weave artifacts between the second field and the first field for a pixel at a pixel position in the second field;
   generating a pixel value for the pixel position in the first field, said pixel value being the weighted average of the pixel at the pixel position in the second field, and an interpolated value from two or more pixels from the field, the weighted average being a function of the measured weave artifacts.

8. The method of claim 7, wherein measuring weave artifacts between the second field and the first field comprises:
   high pass filtering at least one pixel from a plurality of lines from the first field, said plurality of lines comprising a first line that is above the pixel position and a second line that is below the pixel position, and the pixel at the pixel position in the second field.

9. The method of claim 7, further comprising:
   detecting inter-field differences between a region in the second field and a corresponding region in the first field, said first region comprising the pixel position; and
   wherein the weighted average is a function at least in part of the inter-field differences.

10. The method of claim 9, wherein detecting inter-field differences further comprises:
    low pass filtering at least one pixel from a plurality of lines from the first field, said plurality of lines comprising a first line that is above the pixel position and a second line that is below the pixel position; and
    low pass filtering the at least one pixel in the second field, the at least one pixel in the second field comprising the pixel.

11. The method of claim 10, further comprising:
    calculating a difference between a result from low pass filtering the at least one pixel from the plurality of lines from the first field and a result from low pass filtering the pixel in the second field;
    filtering the result from low pass filtering the at least one pixel from the plurality of lines from the first field, the result from low pass filtering the at least one pixel in the second field, and the difference.

12. The method of claim 9, further comprising:
    selecting the second field from a first alternate field and a second alternate field, based on inter-field differences between the first alternate field and the second alternate field.

13. A circuit for deinterlacing, said circuit comprising:
    an input for receiving a first field and a second field;
    a memory for storing a plurality of instructions, wherein execution of the plurality of instructions causes:
        detecting inter-field differences between the second field and the first field for a region in the picture, said region in the picture comprising a pixel position; and
        generating a pixel value for the pixel position in the first field, said pixel value being the weighted average of a pixel at the pixel position in the second field, and an interpolated value from two or more pixels from the field, the weighted average being a function at least in part of the inter-field differences; and
    wherein detecting inter-field differences between the second field and the first field comprises:
        low pass filtering at least one pixel from a plurality of lines from the first field, said plurality of lines comprising a first line that is above the pixel position and a second line that is below the pixel position; and
        low pass filtering at least one pixel in the second field, the at least one pixel comprising the pixel.

14. The circuit of claim 13, wherein execution of the plurality of instructions causes:
   calculating a difference between a result from low pass filtering the at least one pixel from the plurality of lines from the field and a result from filtering the pixel in the second alternate field;
   filtering the result from low pass filtering the at least one pixel from the plurality of lines from the first field, the result from filtering the pixel in the second field, and the difference.

15. The circuit of claim 13, wherein execution of the plurality of instructions causes:
   measuring weave artifacts between the second field and the first field for the pixel at the pixel position in the second field;
   wherein the weighted average is a function at least in part of the weave artifacts.

16. The circuit of claim 15, wherein measuring the weave artifacts further comprises:
   high pass filtering at least one pixel from a plurality of lines from the first field, said plurality of lines comprising a first line that is above the pixel position and a second line that is below the pixel position, and the pixel position.

17. The circuit of claim 13, wherein execution of the plurality of instructions causes:
   selecting the second field from a first alternate field and a second alternate field, based on interfield differences between the first alternate field and the second alternate field.

18. The circuit of claim 17, wherein execution of the plurality of instructions causes:
   selecting the second field from a first alternate field and a second alternate field, based on interfield differences between the first alternate field and the second alternate field.

19. A circuit for deinterlacing, said circuit comprising:
   an input for receiving a first field and a second field;
   a memory for storing a plurality of instructions, wherein execution of the plurality of instructions causes:
      detecting inter-field differences between the second field and the first field for a region in the picture, said region in the picture comprising a pixel position; and
      generating a pixel value for the pixel position in the first field, said pixel value being the weighted average of a pixel at the pixel position in the second field, and an interpolated value from two or more pixels from the field, the weighted average being a function at least in part of the inter-field differences; and
      measuring weave artifacts between the second field and the first field for the pixel at the pixel position in the second field; and
      wherein the weighted average is a function at least in part of the weave artifacts.

20. The circuit of claim 19, wherein measuring the weave artifacts further comprises:
   high pass filtering at least one pixel from a plurality of lines from the first field, said plurality of lines comprising a first line that is above the pixel position and a second line that is below the pixel position, and the pixel position.

* * * * *